United States Patent [19]

Fogelberg

[11] Patent Number: 4,531,423
[45] Date of Patent: Jul. 30, 1985

[54] SPRING-ASSISTED SHIFT APPARATUS

[75] Inventor: Mark J. Fogelberg, Muncie, Ind.

[73] Assignee: Borg-Warner Corporation, Chicago, Ill.

[21] Appl. No.: 539,452

[22] Filed: Oct. 6, 1983

[51] Int. Cl.³ ............................ G05G 5/10; G05G 9/12
[52] U.S. Cl. ...................................... 74/475; 180/247
[58] Field of Search .................. 74/475, 477; 180/247

[56] References Cited

U.S. PATENT DOCUMENTS

| 2,620,872 | 12/1952 | Wyman | 161/15 |
| 2,772,652 | 12/1956 | Du Shane et al. | 74/337.5 |
| 3,456,522 | 7/1969 | Bieber | 74/475 |
| 4,290,318 | 9/1981 | Ookubo et al. | 180/247 X |
| 4,305,309 | 12/1981 | Ookubo et al. | 180/247 X |

Primary Examiner—Tony M. Argenbright
Attorney, Agent, or Firm—Julian Schachner

[57] ABSTRACT

Spring-assisted shift apparatus includes a plate rotatable about an axis to a plurality of positions, the plate defining a cam track. A cam follower is operatively associated with the cam track, and is adapted to move a shift fork in response to selective rotation of the plate. A spring-assist mechanism includes an assist cam track defined by the plate so as to have an arcuate first track surface with a center of curvature on the axis, and a second track surface oriented such that a line perpendicular thereto does not intersect the axis. A spring member supports an assist cam follower in operative association with the assist cam track such that the assist cam follower is in contact with the first track surface when the plate is in one position, and is in contact with the second track surface when the plate is in another position. The spring member is stressed so as to apply a preload biasing force on the plate.

5 Claims, 3 Drawing Figures

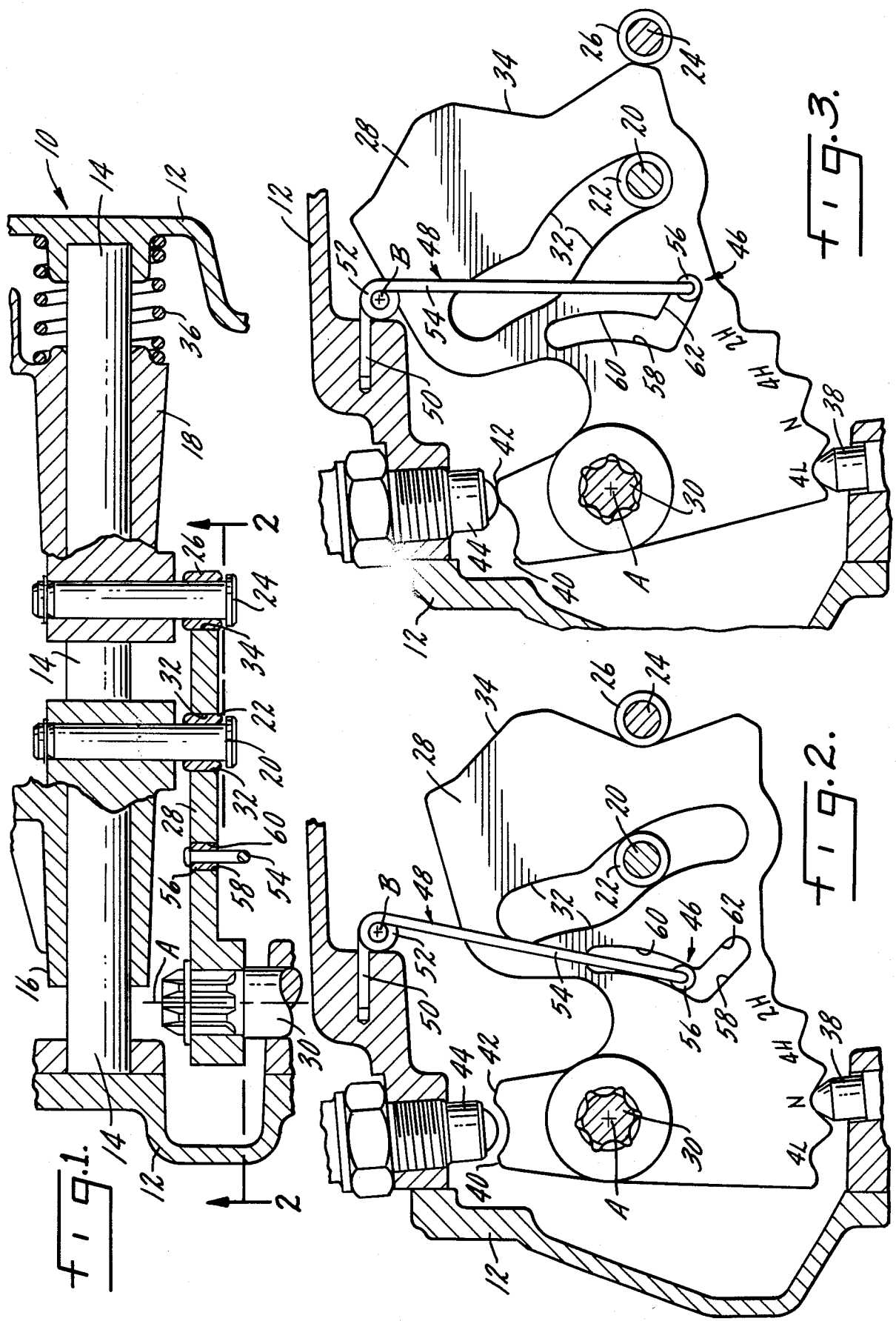

SPRING-ASSISTED SHIFT APPARATUS

BACKGROUND OF THE INVENTION

This invention relates generally to spring-assisted shift apparatus. More particularly, it relates to such apparatus which may incorporated into the shift mechanism of a multi-speed gear box, such as an automotive four-wheel-drive transfer case, which uses a rotatable cam to move shift forks in order to select various operating modes.

In recent years there have been many improvements in automotive drive trains, including improvements relating to transfer cases which provide high- and low-speed ranges in conjunction with two- and four-wheel-drive operating modes. The typical shift apparatus for such a transfer case requires that the vehicle operator move a shift lever to select one of the operating modes. The teeth of a gear set, jaw-clutch assembly or the like must be moved into meshing relationship in order to effect engagement.

It sometimes happens that the teeth abut when engagement is attempted, thus blocking completion of the shift. In order to complete the shift, it is necessary for the operator either to rotate one of the toothed members slightly and then attempt to shift again, or to continue applying pressure to the shift lever while rotating one of the toothed members. The latter is the more expedient method, but often is difficult for the operator to accomplish. This is particularly true if the shift is into the four-wheel-drive, low-range operating mode, as this typically is the situation in which severe driving conditions are encountered.

Thus, there is a need in the art for shift apparatus which provides an assist mechanism in order to insure that engagement in the desired operating mode will be completed once the shift has been initiated. This allows the operator to direct his attention elsewhere, secure in the knowledge that the selected operating mode is engaged.

SUMMARY OF THE INVENTION

This invention is directed to apparatus which meets the need noted above. To that end, there is provided spring-assisted shift apparatus which may be incorporated in an automotive four-wheel-drive transfer case. The apparatus comprises a plate rotatable about an axis to a plurality of positions, the plate defining a cam track. A cam follower is operatively associated with the cam track, and is adapted to move an associated shift fork in response to selective rotation of the plate. A spring-assist mechanism applies a preload biasing force acting on the plate. The mechanism is constructed and arranged such that the force has no effect on the plate when it is rotated toward one position, but completes rotation of the plate to the other position once rotation toward the other position has been initiated.

BRIEF DESCRIPTION OF THE DRAWING

The objects and advantages of this invention will become apparent to those skilled in the art upon careful consideration of the specification herein, including the drawing, wherein:

FIG. 1 is a sectional view of the spring-assisted shift apparatus of this invention;

FIG. 2 is a view taken along the line 2—2 of FIG. 1 showing structural details of the invention in one position; and FIG. 3 is a view showing another position of the structure of FIG. 2.

While this invention is susceptible of embodiment in many different forms, the preferred embodiment is shown in the drawing and described in detail. It should be understood that the present disclosure is considered to be an exemplification of the principles of the invention, and is not intended to limit the invention to this embodiment.

DESCRIPTION OF THE PREFERRED EMBODIMENT

Referring now to the drawing in greater detail, FIG. 1 shows a spring-assisted shift apparatus 10 adapted for use in an automotive four-wheel-drive transfer case or the like. A transfer case housing 12 supports a rail 14. First and second shift forks 16 and 18, respectively, are slidably received on rail 14. Shift fork 16 is adapted to shift an associated planetary gear assembly or the like (not shown) to a high-range position providing direct drive, a low-range position providing reduction ratio drive, and a neutral position disengaging the drive. Shift fork 18 is adapted to shift an associated jaw-clutch assembly or the like (not shown) to disengaged and engaged positions providing two- and four-wheel-drive operating modes.

Shift fork 16 supports a stub shaft 20 which in turn supports a cam follower 22. Similarly, shift fork 18 supports a stub shaft 24 which in turn supports a cam follower 26.

As shown in FIGS. 1 and 2, a cam plate 28 is secured to an actuating shaft 30 supported in housing 12. A suitable shift lever and connecting linkage or the like (not shown) are provided to allow rotation of actuating shaft 30 and plate 28 about an axis A under the control of the vehicle operator.

Plate 28 defines a first cam track 32 into which cam follower 22 extends. Plate 28 also defines a second cam track 34 against which cam follower 26 bears. As shown in FIG. 1, a resilient element 36 reacts against housing 12 and acts upon shift fork 18 to urge cam follower 26 against cam track 34.

It will be apparent from FIGS. 2 and 3 that as plate 28 rotates about axis A, the profile of cam track 32 causes cam follower 22, and thus shift fork 16, to slide along rail 14. Similarly, the profile of cam track 34 causes cam follower 26, and thus shift fork 18, to slide along shift rail 14.

In the preferred form of the invention, the profiles of cam tracks 32 and 34 are such that transfer case 10 has four operating modes. In the neutral (N) operating mode shown in FIG. 2, shift fork 16 disengages the drive through the associated planetary gear assembly, and shift fork 18 disengages the associated clutch assembly to provide two-wheel drive. This mode would be selected when it becomes necessary to tow the vehicle. In the two-wheel-drive, high-range (2H) operating mode (not shown), shift fork 16 engages the planetary gear assembly to provide direct drive, and shift fork 18 disengages the clutch assembly to provide two-wheel drive. In the four-wheel-drive, high-range (4H) operating mode (not shown), shift fork 16 engages the planetary gear assembly to provide direct drive, and shift fork 18 engages the clutch assembly to provide four-wheel drive. Finally, in the four-wheel drive, low-range (4L) operating mode shown in FIG. 3, shift fork 16 engages the planetary gear assembly to provide reduction ratio drive, and shift fork 18 engages the clutch assembly to provide four-wheel drive. Obviously, these relationships are determined by the profiles of cam tracks 32 and 34, thus giving the designer wide latitude in the development of a shift apparatus. A spring-loaded detent device 38 is provided to retain plate 28 in whichever position gives the operating mode selected by the operator.

Plate 28 is provided with extensions 40 and 42 which close the contacts of a switch 44 when the transfer case is in either the 4H or 4L operating mode. This contact closure completes a circuit which energizes a light on the instrument panel, indicating to the operator that the vehicle is in four-wheel-drive.

A spring-assist mechanism 46 includes a spring member 48 having one end 50 secured to housing 12, an intermediate portion 52 coiled about an axis B, and an arm 54 supporting an assist cam follower 56 in the form of a roller or the like. Mechanism 46 also includes an assist cam track 58 having a first track surface 60 and a second track surface 62. Track surface 60 is arcuate with a center of curvature on axis A. Track surface 62 is oriented obliquely relative to axis A; that is, such that a line perpendicular to surface 62 does not intersect axis A.

Roller 56 extends into cam track 58. In the N operating mode shown in FIG. 2, as well as in the 4H and 2H operating modes, roller 56 contacts surface 60. Spring member 48 is under torsional stress, and exerts a preload biasing force in the counterclockwise direction about axis B; that is, to the right as shown in FIG. 2. This force may be thought of as having one component tangential to surface 60 and another component perpendicular to this surface. The tangential component has no effect on plate 28. The perpendicular component also has no effect on plate 28, as any line perpendicular to surface 60 is a radius extending through axis A. Thus, so long as roller 56 bears against surface 60, spring member 48 has no effect on plate 28.

When the operator desires to shift transfer case 10 to the 4L operating mode, he moves the shift lever so as to rotate plate 28 counterclockwise about axis A from the position shown in FIG. 2 to the position shown in FIG. 3. When this shift is initiated, roller 56 moves off of surface 60 and into contact with surface 62. The force of spring member 48 now does have an effect on plate 28, tending to rotate it counterclockwise about axis A.

As noted above, if the associated gear and/or clutch teeth abut, completion of the shift will be blocked, and transfer case 10 will not be engaged fully in the 4L operating mode. Nevertheless, the operator may remove his hand from the shift lever, as spring member 48 exerts a preload biasing force on plate 28 tending to rotate it in the counterclockwise direction. As soon as there is slight relative rotation between the toothed members sufficient to clear the abutment, completion of the shift will be effected automatically. This is particularly advantageous when shifting into the 4L operating mode, as typically the operator will engage this mode under the most severe driving conditions, when the additional torque provided by reduction ratio drive is needed. He is not required to do more than initiate the shift by moving the operating lever to the 4L position, after which he is free to concentrate on other driving functions.

In other words, should blockage occur once the 4L shift has been initiated, a slight movement of the vehicle will cause relative rotation between the mating gear and/or clutch teeth sufficient to bring them out of abutment and into alignment so that they may be fully meshed under the influence of the preload biasing force of spring member 48. Thus, the shift is completed automatically after having been initiated by the operator.

When shifting transfer case 10 from the 4L operating mode of FIG. 3 back to the N operating mode of FIG. 2, an additional force must be exerted by the operator through the shift lever in order to re-apply the torsional stress to spring member 48. This is an advantage, as it helps to prevent an accidental or inadvertent shift out of the 4L operating mode. Once transfer case 10 has been shifted back to the N operating mode, roller 56 again contacts surface 60. No additional torsional stress is applied to spring member 48 as the transfer case is shifted to the 4H or 2H operating modes.

In the preferred form of the invention, arm 54 is an integral part of spring member 48. Thus, a unitary member provides the biasing force required to preload plate 28, and at the same time insure that roller 56 is in the proper position vis-a-vis surfaces 60 and 62.

As described herein, spring member 48 is convenient for use in spring-assist mechanism 46. However, other types of springs may be incorporated into mechanism 46 if desired.

There is disclosed herein a spring-assisted shift apparatus which is simple in design, easily and inexpensively constructed, and which provides a preload biasing force necessary to complete the shift automatically once it has been initiated by the operator.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. In spring-assisted shift apparatus including a plate rotatable about an axis to a plurality of positions, said plate defining at least one cam track, and at least one cam follower operatively associated with said one cam track and adapted to move an associated shift fork in response to selective rotation of said plate to said positions; the improvement comprising a spring-assist mechanism including an assist cam track defined by said plate, said assist cam track having an arcuate first track surface with a center of curvature on said axis, and a second track surface oriented such that a line perpendicular thereto does not intersect said axis, a spring member, and an assist cam follower supported by said spring member in operative association with said assist cam track such that said assist cam follower is in contact with said first track surface when said plate is in one position and in contact with said second track surface when said plate is in another position, said mechanism being constructed and arranged such that said spring member is stressed so as to apply a preload biasing force on said plate when said assist cam follower is in contact with said first track surface.

2. In the apparatus of claim 1, said mechanism being constructed and arranged such that said assist cam follower moves out of contact with said first track surface and into contact with said second track surface when rotation of said plate from said one position toward said other position is initiated.

3. In the apparatus of claim 2, said mechanism being constructed and arranged such that said preload biasing force completes rotation of said plate to said second position when said assist cam follower comes into contact with said second track surface.

4. Spring-assisted shift apparatus comprising a plate rotatable about an axis to a plurality of positions, said plate defining a cam track, a cam follower operatively associated with said cam track and adapted to move an associated shift fork in response to selective rotation of said plate to said positions, and a spring-assist mechanism including means applying a preload biasing force acting on said plate, said mechanism being constructed and arranged such that said force has no effect on said plate when it is rotated toward at least one position, and such that said force completes rotation of said plate to another position after rotation thereof from said one position toward said other position has been initiated.

5. A transfer case comprising a housing, a first shift fork movable in said housing for engaging the transfer case in high and low speed ranges, a second shift fork movable in said housing for engaging the transfer case in two- and four-wheel drive operating modes, and a spring-assisted shift apparatus for selectively moving said shift forks, said apparatus including a plate rotatable in said housing about an axis, said plate defining first and second cam tracks, first and second cam followers operatively associated with said first and second cam tracks and drivingly connected to said first and second shift forks, said plate also defining an assist cam track having a first surface with a center of curvature on said axis, and a second surface oriented obliquely relative to said axis, a spring member secured to said housing and having a portion thereof coiled about another axis, and an arm extending from said coiled portion, and an assist cam follower supported by said arm and extending into said assist cam track for contact with said surfaces, said spring member being under torsional stress when said assist cam follower is in contact with said first surface, whereby said spring member develops a preload biasing force tending to continue rotation of said plate after initial rotation thereof moves said assist cam follower out of contact with said first surface and into contact with said second surface.

* * * * *